US008730668B2

(12) United States Patent
Hu et al.

(10) Patent No.: US 8,730,668 B2
(45) Date of Patent: May 20, 2014

(54) ELECTRONIC DEVICE

(75) Inventors: Guang Hu, New Taipei (TW); Sheng-Zhang Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 44 days.

(21) Appl. No.: 13/456,701

(22) Filed: Apr. 26, 2012

(65) Prior Publication Data

US 2012/0307429 A1   Dec. 6, 2012

(30) Foreign Application Priority Data

Jun. 3, 2011   (CN) .......................... 2011 1 0148940

(51) Int. Cl.
*H05K 5/00* (2006.01)
*H05K 7/00* (2006.01)
*G06F 1/16* (2006.01)

(52) U.S. Cl.
USPC ............. 361/679.58; 361/679.26; 361/679.55

(58) Field of Classification Search
USPC ............. 361/679.26, 679.55, 679.58, 679.57; 292/251.5
See application file for complete search history.

(56) References Cited

U.S. PATENT DOCUMENTS

| 6,517,129 | B1 * | 2/2003 | Chien et al. ................. 292/251.5 |
| 7,009,837 | B2 | 3/2006 | Lo |
| 7,088,588 | B2 * | 8/2006 | Lee ................................ 361/725 |
| 7,261,331 | B2 * | 8/2007 | Lin ................................ 292/116 |
| 7,515,404 | B2 * | 4/2009 | Zhang et al. ............. 361/679.27 |
| 7,637,540 | B2 * | 12/2009 | Chiang ........................... 292/45 |
| 8,066,308 | B2 * | 11/2011 | Lee ................................ 292/49 |
| 8,085,533 | B2 * | 12/2011 | Zhao et al. ............... 361/679.58 |
| 8,109,541 | B2 * | 2/2012 | Chang et al. .................... 292/95 |
| 2006/0038415 | A1 * | 2/2006 | Liu et al. .................... 292/251.5 |

FOREIGN PATENT DOCUMENTS

| TW | I254284 B | 5/2006 |
| TW | M312853 U | 5/2007 |

OTHER PUBLICATIONS

Taiwan Office Action dated Aug. 23, 2012; Appln. No. 100119965.

* cited by examiner

*Primary Examiner* — Anthony Haughton
(74) *Attorney, Agent, or Firm* — Ladas & Parry LLP

(57) ABSTRACT

An electronic device includes a housing unit, an electronic module and a locking mechanism. The housing unit includes a first housing and a second housing that is coupled detachably to the first housing. The locking mechanism includes an operable member and a drive member. The drive member can prevent movement of the second housing relative to the first housing. The operable member is operable to release the second housing from the drive member. When the drive member is moved to a position whereat the second housing is released, it can be maintained in the position, so that a user doesn't have to maintain the position of the drive member through operation of the operable member when separating the second housing from the first housing.

11 Claims, 11 Drawing Sheets

ELECTRONIC DEVICE

CROSS-REFERENCE TO RELATED APPLICATION

This application claims priority of Chinese Application 201110148940.1, filed on Jun. 3, 2011, the disclosure of which is incorporated herein by reference.

BACKGROUND OF THE INVENTION

1. Field of the Invention

The present invention relates to an electronic device and, more particularly, to a lock mechanism of an electronic device with a replaceable external housing.

2. Description of the Related Art

With the trend of technical development and social variety, the existing electronic devices, for example, notebook computers, cellular phones and the like, are required to not only have necessary performance, but also have an appealing appearance. Therefore, it is important for the notebook computers, the cellular phones or other electronic products to have a replaceable external housing.

For example, Taiwanese Patent No. M312853 (Application No. 95218591) discloses a notebook computer and a replaceable computer screen housing thereof as a technique for replacing a screen housing of a notebook computer.

SUMMARY OF THE INVENTION

Therefore, the object of the present invention is to provide an electronic device that can enhance the replacement convenience of an external housing thereof.

Accordingly, an electronic device of the present invention comprises a housing unit, an electronic module and a locking mechanism. The housing unit includes a first housing, a second housing and a stop member. The second housing is coupled to the first housing and is movable relative to the first housing in a disassembly direction so as to separate from the first housing. The stop member is disposed on one of the first housing and the second housing. The electronic module is coupled to the housing unit. The locking mechanism includes an operable member and a drive member. The operable member is mounted on the first housing and is operable to move resiliently. The drive member is movable resiliently to a retracted position by pressing the operable member and is biased to an engaging position. In the engaging position, the drive member engages the second housing, thereby preventing movement of the second housing relative to the first housing in the disassembly direction. In the retracted position, the second housing is allowed to move relative to the first housing in the disassembly direction, and the drive member is stopped releasably by the stop member so as to prevent the drive member from restoring to the engaging position.

An effect of the present invention is that, by maintaining the drive member in the retracted position by means of the stop member, a user doesn't have to maintain the position of the drive member through operation of the operable member when separating the second housing from the first housing.

Preferably, the first housing includes a first plate member and a first opening that is formed in the first plate member. The second housing includes a second plate member and a projection that is formed on the second plate member and that extends through the first opening. Disengagement of the projection from the first opening in the disassembly direction is prevented by the drive member when the drive member is in the engaging position.

Preferably, the first housing further includes a first engaging structure disposed at the first plate member. The second housing further includes a second engaging structure disposed at the second plate member. The second housing is coupled to the first housing by engaging the second engaging structure to the first engaging structure in an assembly direction that is opposite to the disassembly direction. The second housing is movable relative to the first housing in the disassembly direction to disengage the second engaging structure from the first engaging structure. The drive member is pushable by the operable member in a first direction that is perpendicular to the assembly direction to move to the retracted position, such that the drive member is stopped at the retracted position by the stop member.

Preferably, the drive member includes a drive body, an engaging portion connected to the drive body, and an extension portion connected to the drive body. The engaging portion is in a form of a hook. The projection is hooked over the engaging portion so as to prevent movement of the projection relative to the first housing in the disassembly direction when the drive member is in the engaging position. The extension portion is stopped by the stop member so as to prevent movement of the drive member to the engaging position when the drive member is in the retracted position.

Preferably, the extension portion is in a form of a resilient arm and has an distal end portion that is spaced apart from the drive body. The extension portion is deformable resiliently to permit the distal end portion to approach the drive body, the distal end portion passing past the stop member and being pushed by the stop member to approach the drive body when the drive member is moved from the engaging position to the retracted position. The distal end portion extends from the drive body toward the stop member and abuts against the stop member when the drive member is in the retracted position.

Preferably, the stop member is disposed on the first plate member. The extension portion extends generally parallel with the first direction. The operable member includes an operable body and a push portion that is connected to the operable body. The operable body is operable to move resiliently in the disassembly direction. The push portion extends generally parallel with the disassembly direction and is positioned such that, when the drive member is in the retracted position, the distal end portion of the extension portion is aligned with the push portion in the disassembly direction so as to be pushed to separate from the stop member by the push portion when the operable member is pressed.

Preferably, the extension portion extends generally parallel with the first direction. The stop member is disposed on the second plate member. The first plate member has a second opening through which the stop member extends. The stop member separates from the extension portion when the second housing is moved relative to the first housing in the disassembly direction.

Preferably, the engaging portion and the drive body define cooperatively an engaging groove therebetween. The engaging portion has an inclination surface that faces away from the engaging groove. The inclination surface is allowed to be pushed by the projection in the assembly direction to result in movement of the drive member in the first direction.

Preferably, the first plate member further has a plate edge. The operable member further includes a spring. The operable body has a pressing end that extends out of the plate edge, and an inner end that is opposite to the pressing end. The inner end has a first inclination surface that abuts against the drive body. The pressing end is operable to move in the disassembly direction, so that the drive body is pushed to move in the first direction by the first inclination surface. The spring is disposed between the first housing and the operable body to provide a biasing force for restoring the operable body to its original position.

Preferably, the first housing further includes a first guiding structure that is disposed on the first plate member for guiding the operable body to move in the disassembly direction.

Preferably, the first housing further includes a second guiding structure that is disposed on the first plate member for guiding the drive body to move in the first direction.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
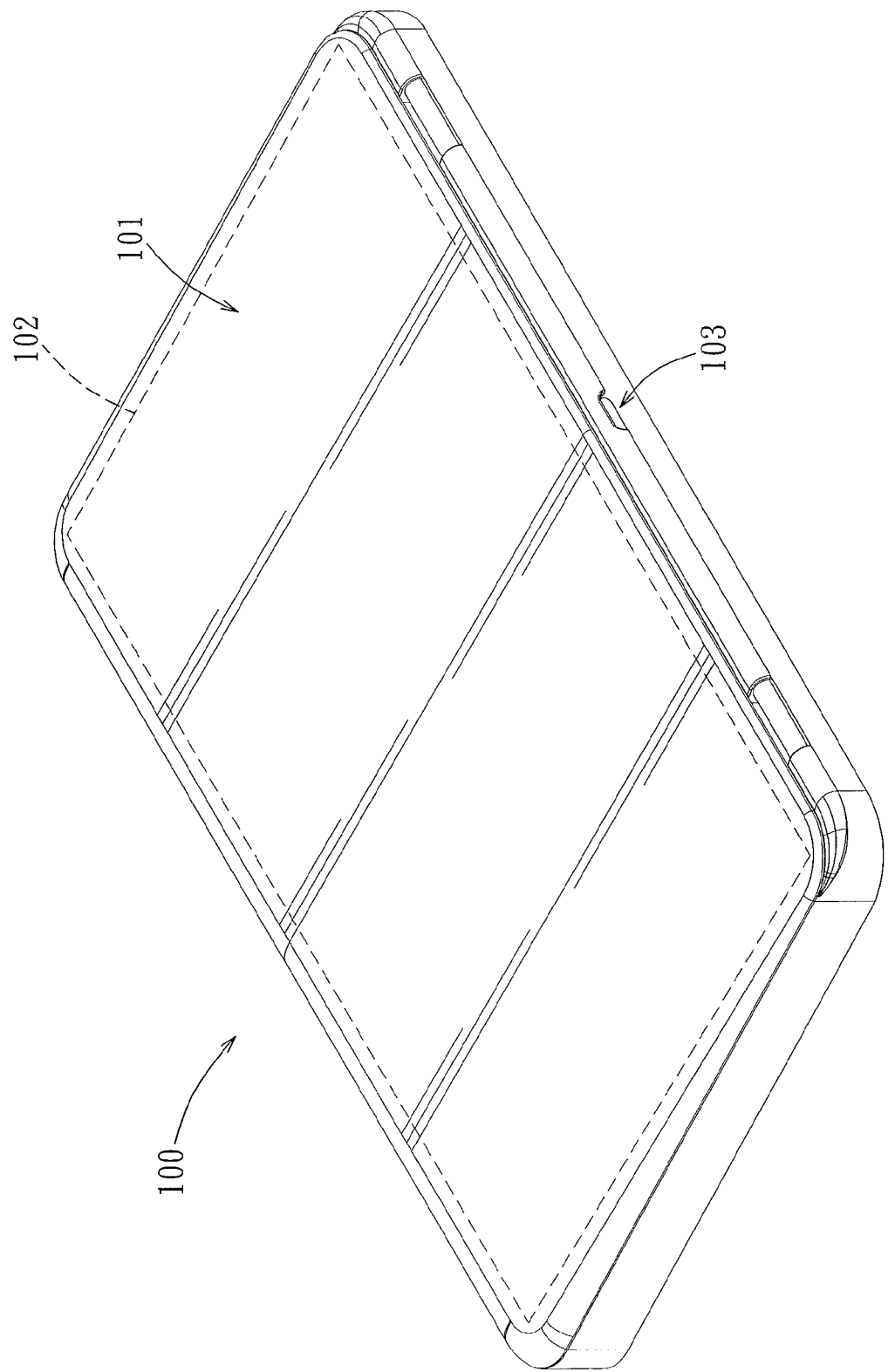
FIG. 1 is a perspective view of a first preferred embodiment of an electronic device according to the present invention.

Before the present invention is described in greater detail, it should be noted that like components are assigned the same reference numerals throughout the following disclosure. It is noted that the content of Taiwanese Application No. 100100309 filed on Jan. 5, 2011 by the Applicant is entirely incorporated herein for reference.

Referring to FIG. 1, a first preferred embodiment of an electronic device 100 of the present invention comprises a housing unit 101, an electronic module 102 and a locking mechanism 103. The locking mechanism 103 is mounted on the housing unit 101. The housing unit 101 is adapted to be coupled to the electronic module 102. In this embodiment, the electronic device 100 is embodied as a screen of a notebook computer, that is, the electronic module 102 is a display panel module. However, the electronic device 100 may further comprise the host of the notebook computer to form a complete notebook computer. In this case, the electronic module 102 further includes the electronic components inside the host. Alternatively, the electronic device 100 may be a cellular phone or other electronic device that is provided with a replaceable external outer housing.

Figure 2:
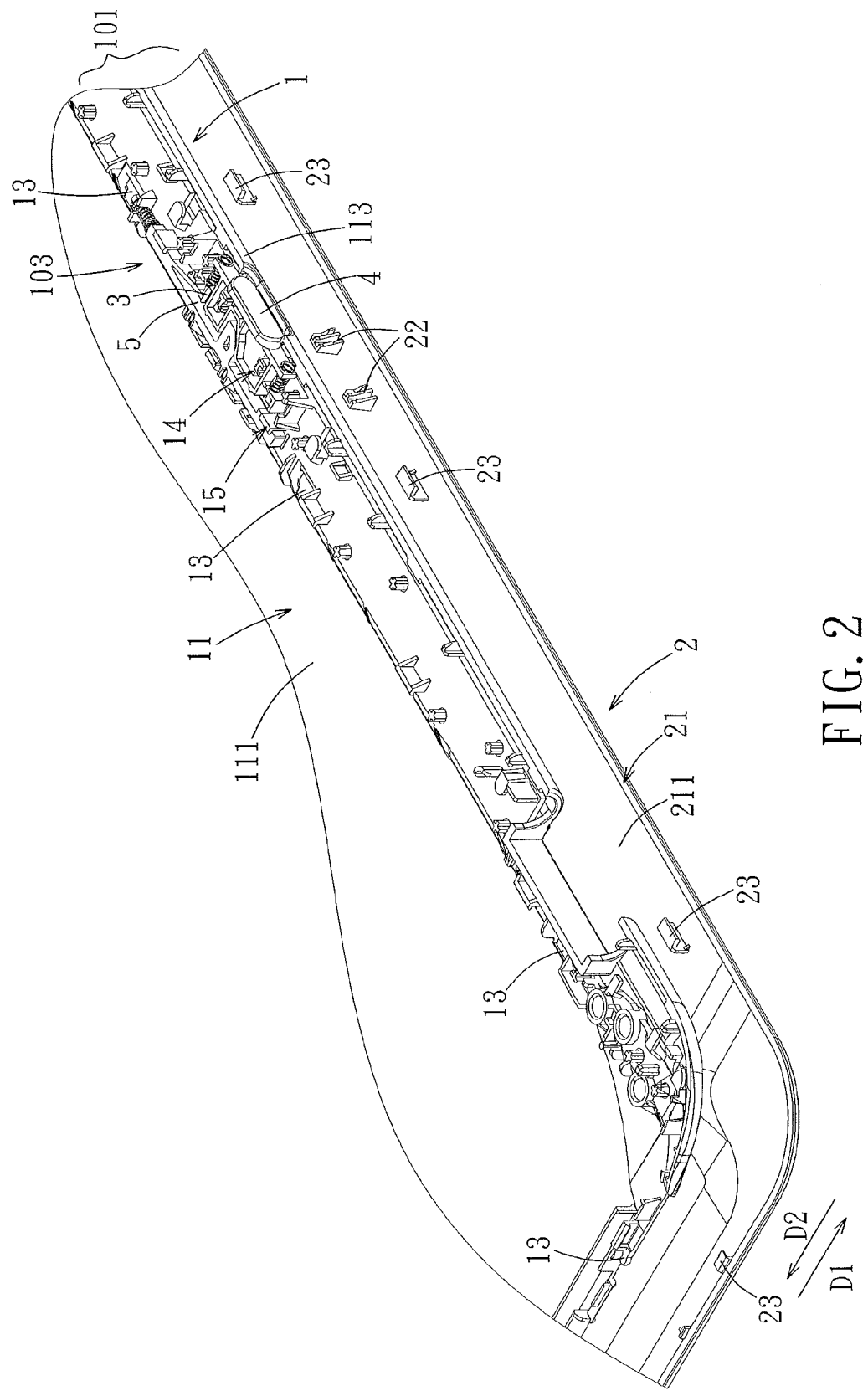
FIG. 2 is a fragmentary, partly exploded perspective view of a first housing and a second housing of the first preferred embodiment.
Figure 3:
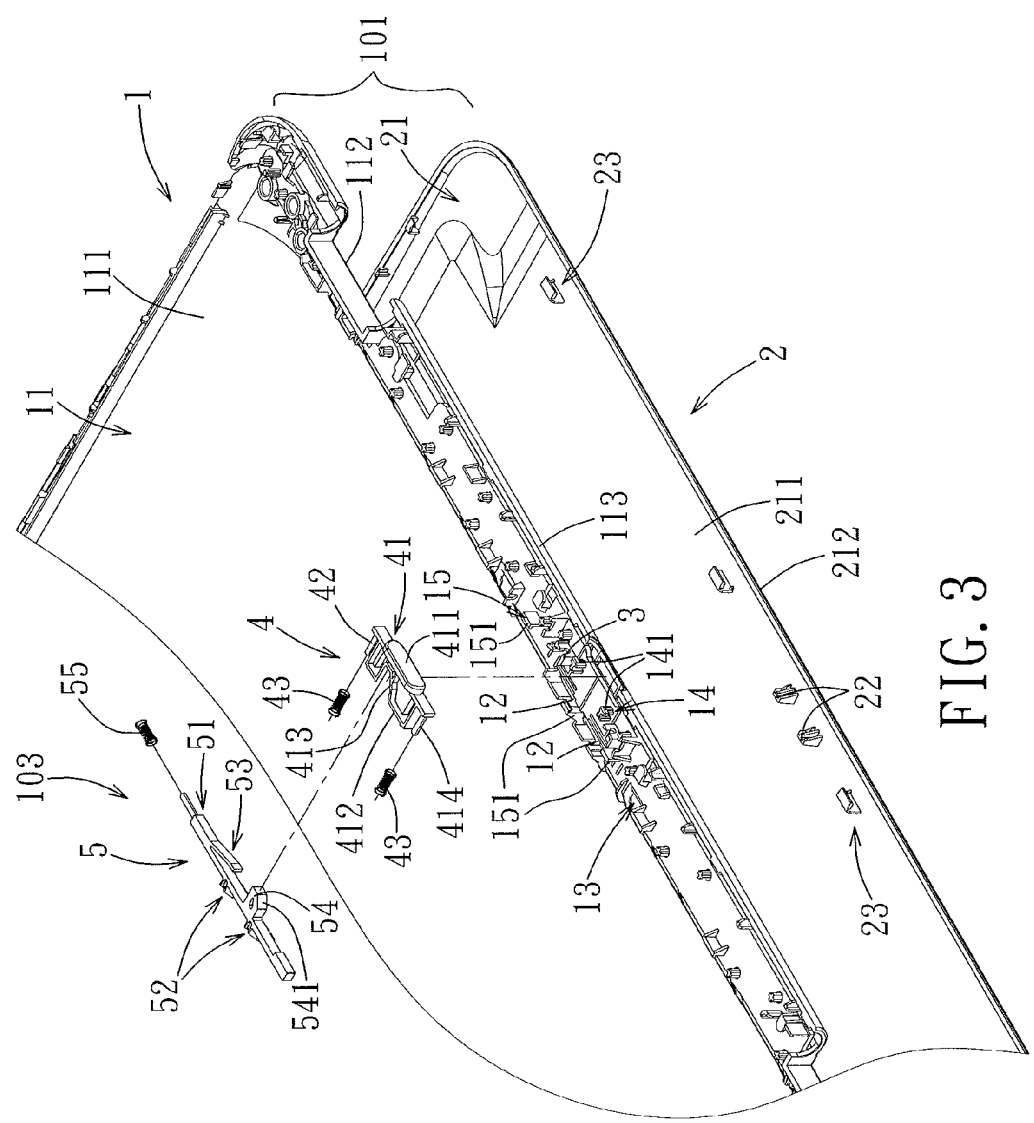
FIG. 3 is an exploded perspective view of an operable member and a drive member of the first preferred embodiment.

Referring to FIGS. 2 and 3, the housing unit 101 includes a first housing 1, a second housing 2 and a stop member 3. In this embodiment, the first housing 1 is an internal housing of the screen and the second housing 2 is an external housing of the screen. The second housing 2 is coupled detachably to first housing 1. That is, the second housing 2 is detachable from the first housing 1 for replacing purposes.

The first housing 1 includes a first plate member 11, a plurality of first openings 12 (with reference to FIG. 5), a plurality of first engaging structures 13, a first guiding structure 14 and a second guiding structure 15. The first plate member 11 has a first inside surface 111, a first outside surface 112 and a rear edge 113. When the housing unit 101 and the electronic module 102 are coupled to each other (see FIG. 1), the first inside surface 111 of the first plate member 11 faces the electronic module 102. The stop member 3 is in the form of a block that projects from the first inside surface 111 of the first plate member 11. The first openings 12 extend through the first plate member 11 and are adjacent to the rear edge 113 of the first plate member 11. In this embodiment, the stop member 3 is disposed between the rear edge 113 of the first plate member 11 and the first openings 12. The first engaging structures 13 are engaging grooves or tabs that are disposed at the first plate member 11. The first guiding structure 14 includes a plurality of first guiding blocks 141 that project from the first inside surface 111 of the first plate member 11. The second guiding structure 15 includes a plurality of second guiding blocks 151 that project from the first inside surface 111 of the first plate member 11.

The second housing 2 includes a second plate member 21, a plurality of projections 22 that are formed on the second plate member 21, and a plurality of second engaging structures 23. The second plate member 21 has a second inside surface 211 and a second outside surface 212. The projections 22 project from the second inside surface 211 of the second plate member 21. The second engaging structures 23 are tabs or engaging grooves that are disposed at the second plate member 21.

The second housing 2 may be coupled to the first housing 1 by engaging the second engaging structures 23 into the first engaging structures 13 of the first housing 1 in an assembly direction (i.e. a rearward direction) D1. In practice, when it is desired to assemble the second housing 2 to the first housing 1, the second inside surface 211 of the second housing 2 is disposed to face the first outside surface 112 of the first plate member 11, and the projections 22 is extended through the first openings 12 of the first housing 1 to protrude out of the first inside surface 111 of the first plate member 11 (with reference to FIG. 5). The second housing 2 is then moved rearwardly relative to the first housing 1 in the assembly direction D1 to engage the second engaging structures 23 with the first engaging structures 13, thereby coupling the second housing 2 to the first housing 1.

On the other hand, when it is desired to separate the second housing 2 from the first housing 1, the second housing 2 is moved relative to the first housing 1 in a disassembly direction D2 that is opposite to the assembly direction D1 (i.e. moved forwardly) so that the second engaging structures 23 can be detached from the first engaging structures 13, thereby separating the second housing 2 from the first housing 1.

Figure 5:
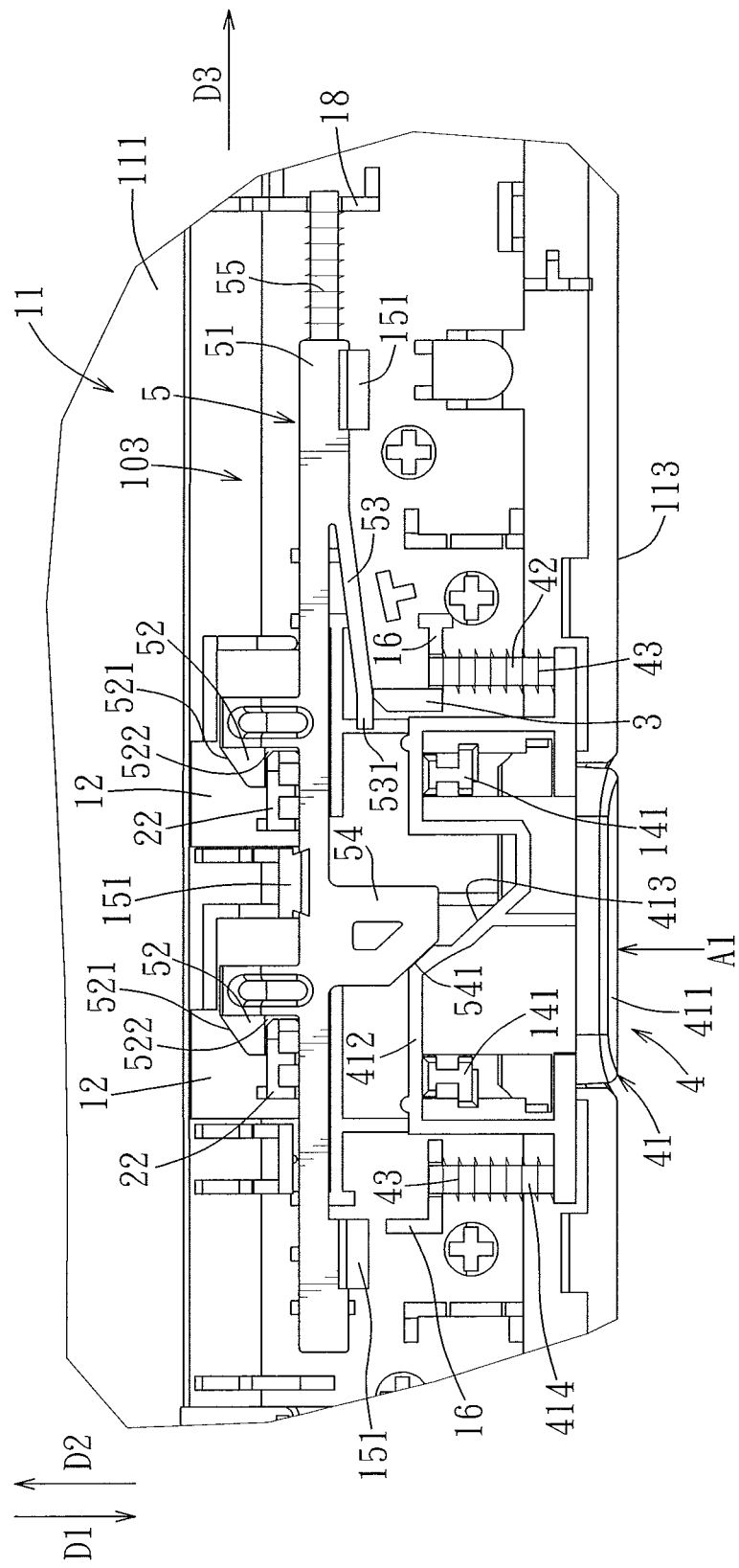
FIG. 5 is a schematic plan view of the first embodiment, illustrating that the drive member is in an engaging position.
Figure 6:
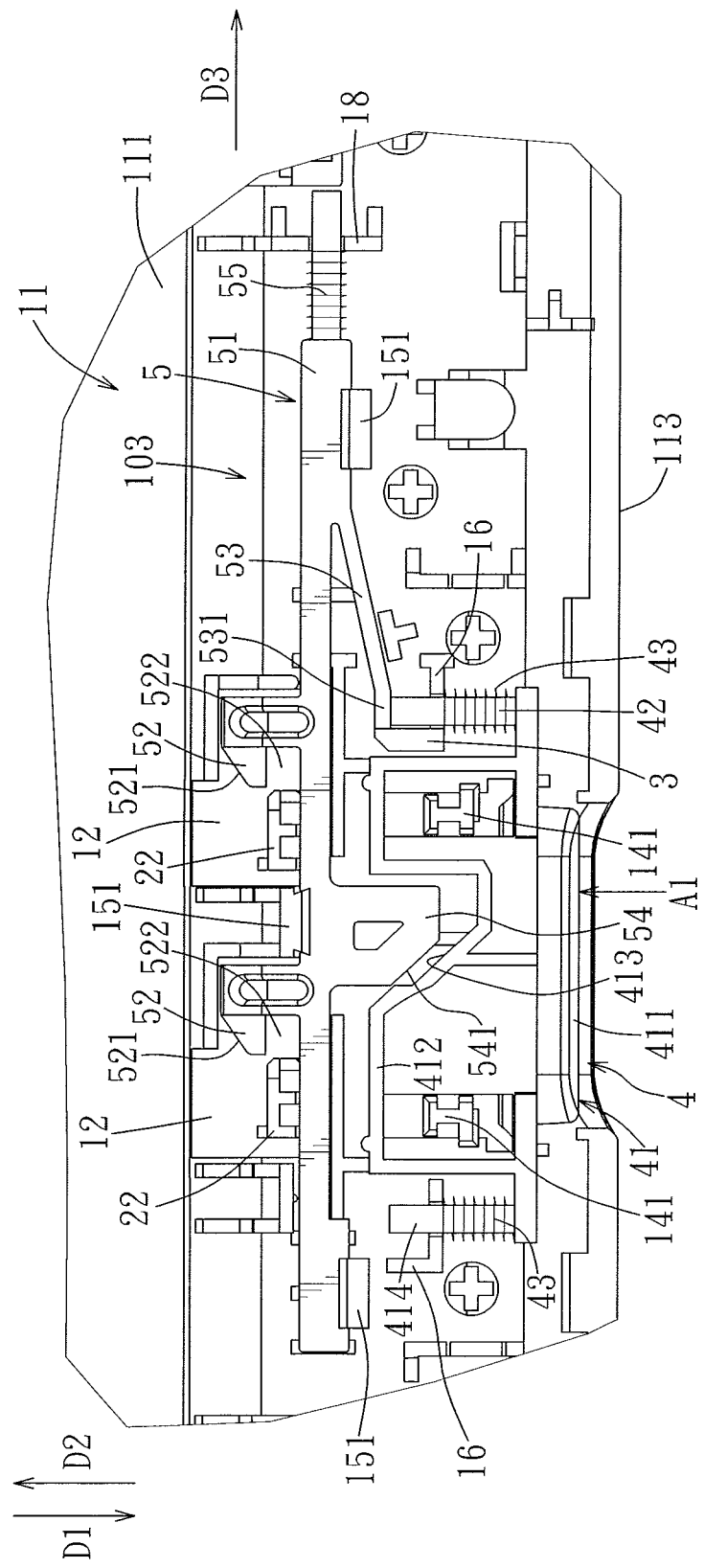
FIG. 6 is view similar to FIG. 5 but illustrating that the drive member is in a retracted position.

The locking mechanism 103 of the present embodiment includes an operable member 4 and a drive member 5. The operable member 4 and the drive member 5 are both mounted on the first inside surface 111 of the first plate member 11. The operable member 4 is operable to move resiliently. The drive member 5 is movable resiliently to a retracted position by pressing the operable member 4, and is biased to an engaging position. In the engaging position, as illustrated in FIG. 5, the drive member 5 engages the projections 22 of the second housing 2, thereby preventing movement of the second housing 2 relative to the first housing 1 in the disassembly direction D2. In the retracted position, as illustrated in FIG. 6, the drive member 5 is detached from the projections 22 of the second housing 2 so that the second housing 2 is allowed to move relative to the first housing 1 in the disassembly direction D2, and the drive member 5 is stopped releasably by the stop member 3 so as to prevent the drive member 5 from restoring to the engaging position.

Figure 4:
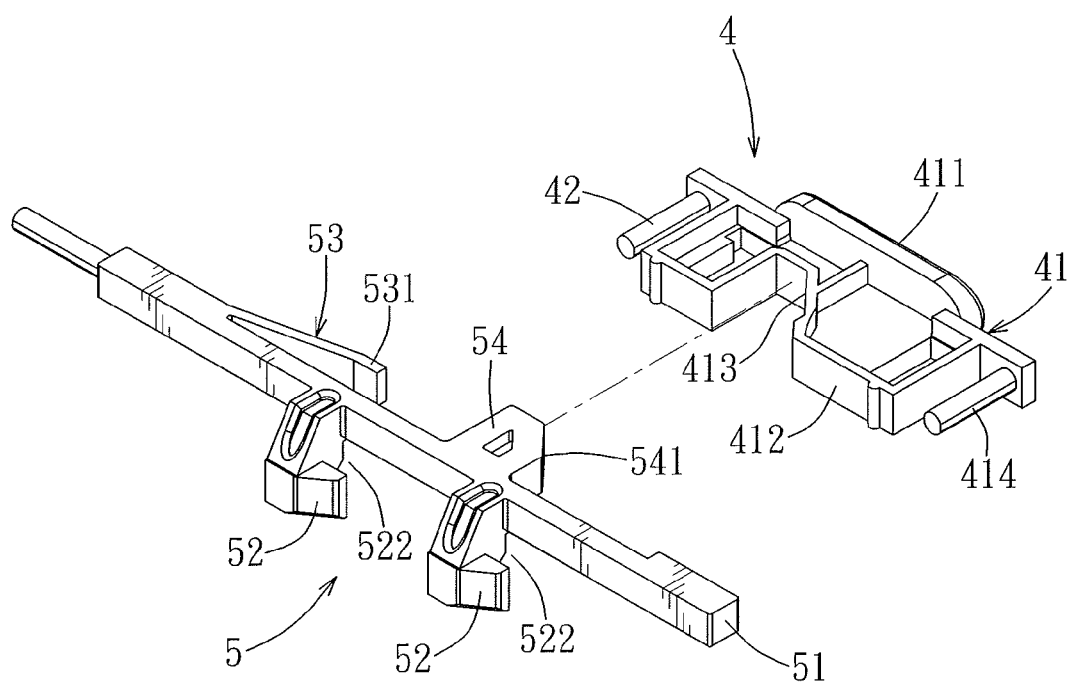
FIG. 4 is an exploded perspective view of the operable member and the drive member, viewed from another angle.

Referring FIGS. 3 to 5, specifically, the operable member 4 of the present embodiment includes an operable body 41, a push portion 42 connected to the operable body 41, and a plurality of springs 43. The operable body 4 has a pressing end 411, and an inner end 412 that is opposite to the pressing end 411. The inner end 412 has a first inclination surface 413. The push portion 42 is in the shape of a post that projects from the pressing end 411 of the operable body 41 toward the inner end 412. In addition, the operable body 41 further has an extension pillar 414 that projects from the pressing end 411 toward the inner end 412. The springs 43 are sleeved respectively on the push portion 42 and the extension pillar 414.

The pressing end 411 of the operable member 4 extends out of the rear edge 113 of the first plate member 11. The inner end 412 of the operable member 4 faces forwardly. That is, the pressing end 411 and the inner end 412 are opposite to each other in the assembly direction D1 (also in the disassembly direction D2). The push portion 42 extends in the disassembly direction D2. Front ends of the springs 43 abut respectively against two first protrusions 16 that are formed on the first inside surface 111 of the first plate member 11. In addition, the operable body 41 is guided by the first guiding blocks 141 to move reciprocally in the assembly direction D1 and the disassembly direction D2. When the pressing end 411 is pressed forwardly, the operable body 41 is moved in the disassembly direction D2, and the push portion 42 moves forwardly relative to the first protrusions 16, so that the springs 43 are compressed.

The drive member 5 includes a drive body 51, a plurality of engaging portions 52, an extension portion 53, an abutment portion 54 and a spring 55. The engaging portions 52, the extension portion 53, the abutment portion 54 and the spring 55 are all connected to the drive body 51. The drive body 51 is elongated in shape. The abutment portion 54 and an assembly of the engaging portions 52 project respectively from two opposite sides of the drive body 51 in a direction that is perpendicular to a longitudinal direction of the drive body 51. Each of the engaging portions 52 is in the form of a hook. Each of the engaging portions 52 cooperates with the drive body 51 to define an engaging groove 522 therebetween, and has an inclination surface 521 that faces away from the engaging groove 522. In this embodiment, the abutment portion 54 is generally in the form of a boss and has a second inclination surface 541. The extension portion 53 is a resilient arm that is connected to the drive body 51 at one end thereof and that extends in a direction generally parallel with the longitudinal direction of the drive body 51. Specifically, the extension portion 53 has a distal end portion 531 that is parallel with and spaced apart from the drive body 51. The distal end portion 531 may be deformed resiliently to approach the drive body 51 by applying a force to the extension portion 53.

When the drive member 5 is disposed on the first inside surface 111 of the first plate member 11, the drive body 51 of the drive member 5 is disposed between the second guiding blocks 151 and between the first openings 12 and the operable member 4 in a first direction D3 that is perpendicular to the assembly direction D1 (and the disassembly direction D2), so that the drive body 51 can be guided by the second guiding blocks 151 to move in the first direction D3. The engaging portions 52 are adjacent to the first openings 12, and the abutment portion 54 extends toward the inner end 412 of the operable body 41, such that the second inclination surface 541 is adjacent to the first inclination surface 413. The distal end portion 531 of the extension portion 53 extends in the first direction D3. The spring 55 has one end that is sleeved on an end of the drive body 51, and the other end that abuts against a second protrusion 18 which projects from the first inside surface 111 of the first plate member 11. Due to the presence of the spring 55, the drive member 5 can be stopped by the projections 22 in the disassembly direction D2 in a normal position, and can be pushed by the operable member 4 to move resiliently away from the projections 22.

Referring to FIGS. 2, 5 and 6, when the second housing 2 is assembled to the first housing 1, the projections 22 of the second housing 2 extend respectively into the first openings 12 of the first housing 1. When the drive member 5 is in the engaging position, the engaging portions 52 of the drive member 5 are hooked respectively over the projections 22 of the second housing 2, that is, the projections 22 are positioned respectively in the engaging grooves 522 between the drive body 51 and the engaging portions 52, so that the projections 22 are stopped by the engaging portions 52 in the disassembly direction D2. In this position, the distal end portion 531 of the extension portion 53 is disposed between the drive body 51 and the stop member 3, and the extension portion 53 is slightly squeezed and deformed by the stop member 3, so that the distal end portion 531 is closer to the drive body 51 than in a state in which no force is exerted on the extension portion 53.

When it is desired to separate the second housing 2 from the first housing 1, a force is applied to press the pressing end 411 of the operable member 4 in a direction (as indicated by an arrow A1 in FIG. 5), so as to move the operable body 41 in the disassembly direction D2 to thus push the drive body 51 in the first direction D3 due to relative sliding movement between the first inclination surface 413 and the second inclination surface 541, thereby compressing the spring 55 and disengaging the engaging portions 52 from the projections 22, that is, disengaging the projections 22 from the engaging grooves 522. When the engaging portions 52 are detached from the projections 22, the distal end portion 531 of the extension portion 53 passes past the stop member 3 in such a manner that the extension portion 53 is squeezed. After the distal end portion 531 of the extension portion 53 separates from the stop member 3, it is biased by virtue of the resilient force itself to move to a position aligned with the stop member 3 in the first direction D3, as illustrated in FIG. 6. Hence, the distal end portion 531 of the drive body 51 is biased by the spring 55 to abut against the stop member 3, so that the drive member 5 is prevented by the stop member 3 from restoring to the engaging position through the resilient force of the spring 55. In other words, a user doesn't have to press continuously the operable member 4 in order to maintain the drive member 5 in the retracted position. At this time, the distal end portion 531 is aligned with the push portion 42 of the operable member 4 in the disassembly direction D2.

Then, the second plate member 21 can be moved relative to the first plate member 11 in the disassembly direction D2 to disengage the second engaging structures 23 from the first engaging structures 13, thereby detaching the second housing 2 from the first housing 1.

After the second housing 2 is assembled again to the first housing 1, in order to restore the drive member 5 to the engaging position, the pressing end 411 of the operable member 4 is pressed again to move the push portion 42 in the disassembly direction D2, so as to push the distal end portion 531 of the extension portion 53 away from the stop member 3. Hence, the drive member 5 can be restored to the engaging position by virtue of the resilient force of the spring 55, thereby moving the engaging portions 52 back to the position where they are stopped by the projections 22.

In view of the above, through cooperation of the extension portion 53 with the stop member 3, when the drive member 5 is moved to release its engagement with the projections 22 of the second housing 2, it can be maintained in a state in which the engaging portions 52 are separated from the projections 22. In this way, the user can concentrate attention on the action for separating the second housing 2 from the first housing 1 without pressing continuously the operable member 4 to maintain the drive member 5 in the state in which the engaging portions 52 is separated from the projections 22, thereby further facilitating the operation of separating the second housing 2 from the first housing 1 by the user.

Figure 7:
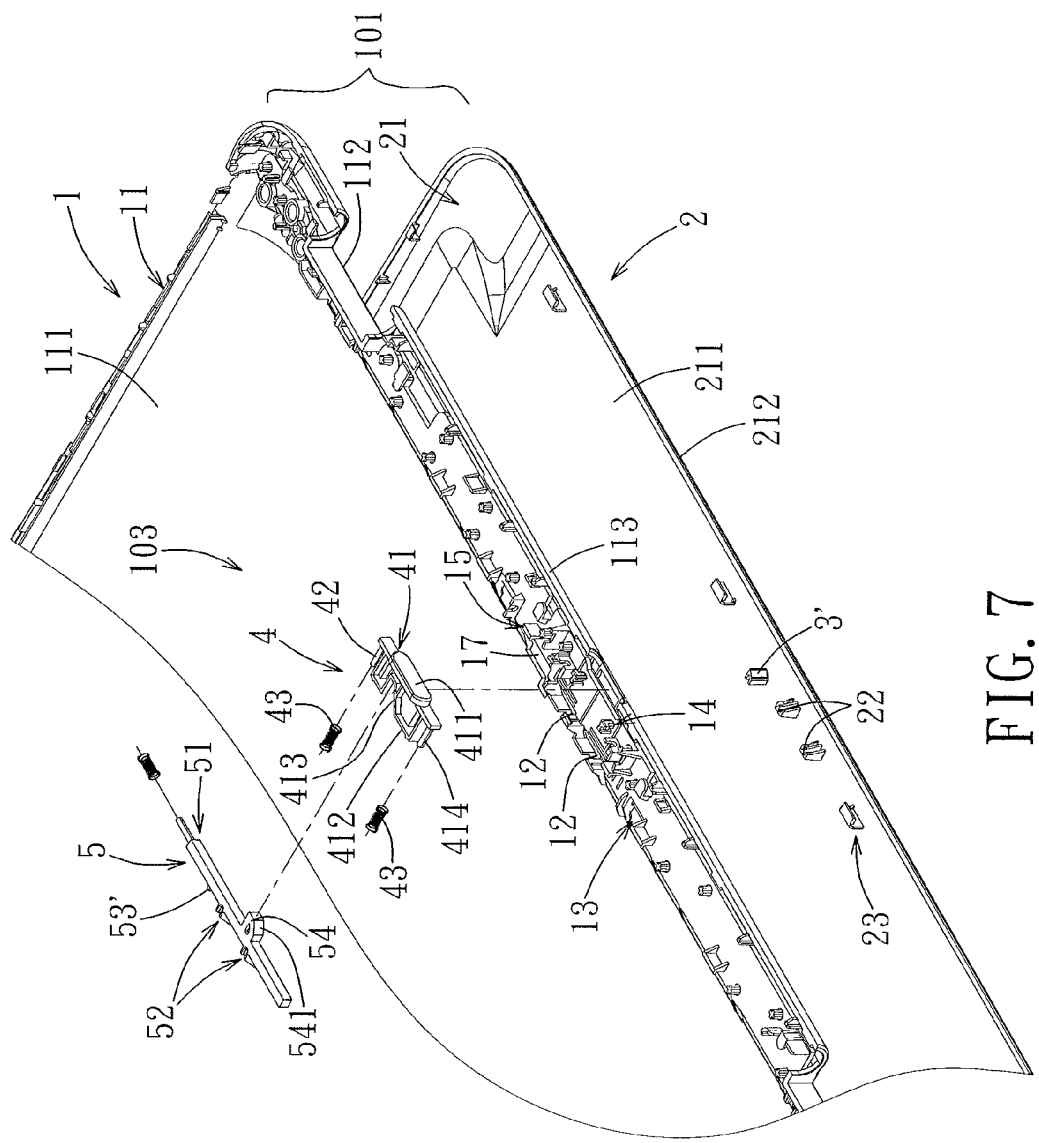
FIG. 7 is an exploded perspective view of an operable member and a drive member of a second preferred embodiment of an electronic device according to the present invention.
Figure 8:
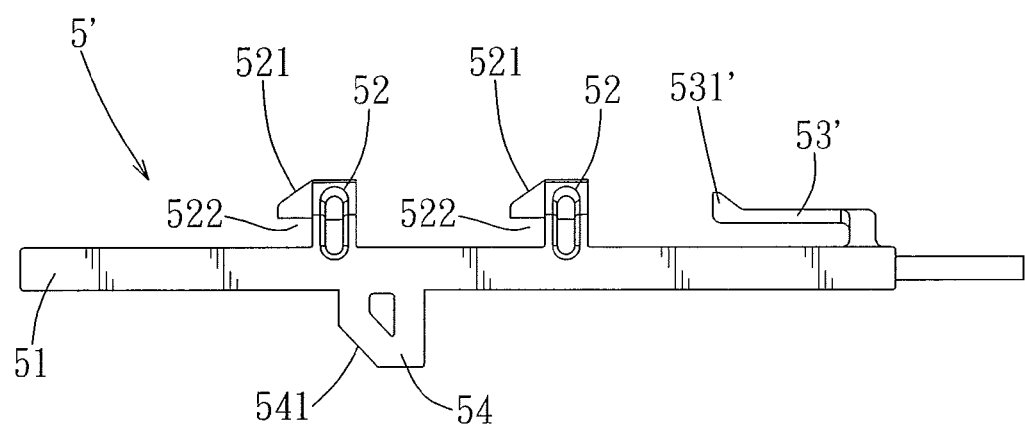
FIG. 8 is a plan view of the drive member of the second preferred embodiment.

Referring to FIGS. 7 and 8, there is shown a second preferred embodiment of the present invention. The second preferred embodiment differs from the first preferred embodiment in the position of the stop member 3' and the configuration of the extension portion 53'. More specifically, the stop member 3 of the second preferred embodiment projects from the second inside surface 211 of the second plate member 21 of the second housing 2, and the first housing 1 further includes a second opening 17 that extends through the first plate member 11. When the second housing 2 is assembled to the first housing 1, the stop member 3' extends through the second opening 17 and projects out of the first inside surface 111 of the first plate member 11.

In addition, in the second preferred embodiment, the extension portion 53' and the engaging portions 52 are on the same side of the drive body 51. The structure of the extension portion 53' is similar to that in the first preferred embodiment, which is a resilient arm structure generally parallel with the drive body 51 and which has an distal end portion 531 that is spaced apart from the drive body 51 in a substantially parallel relationship.

Figure 9:
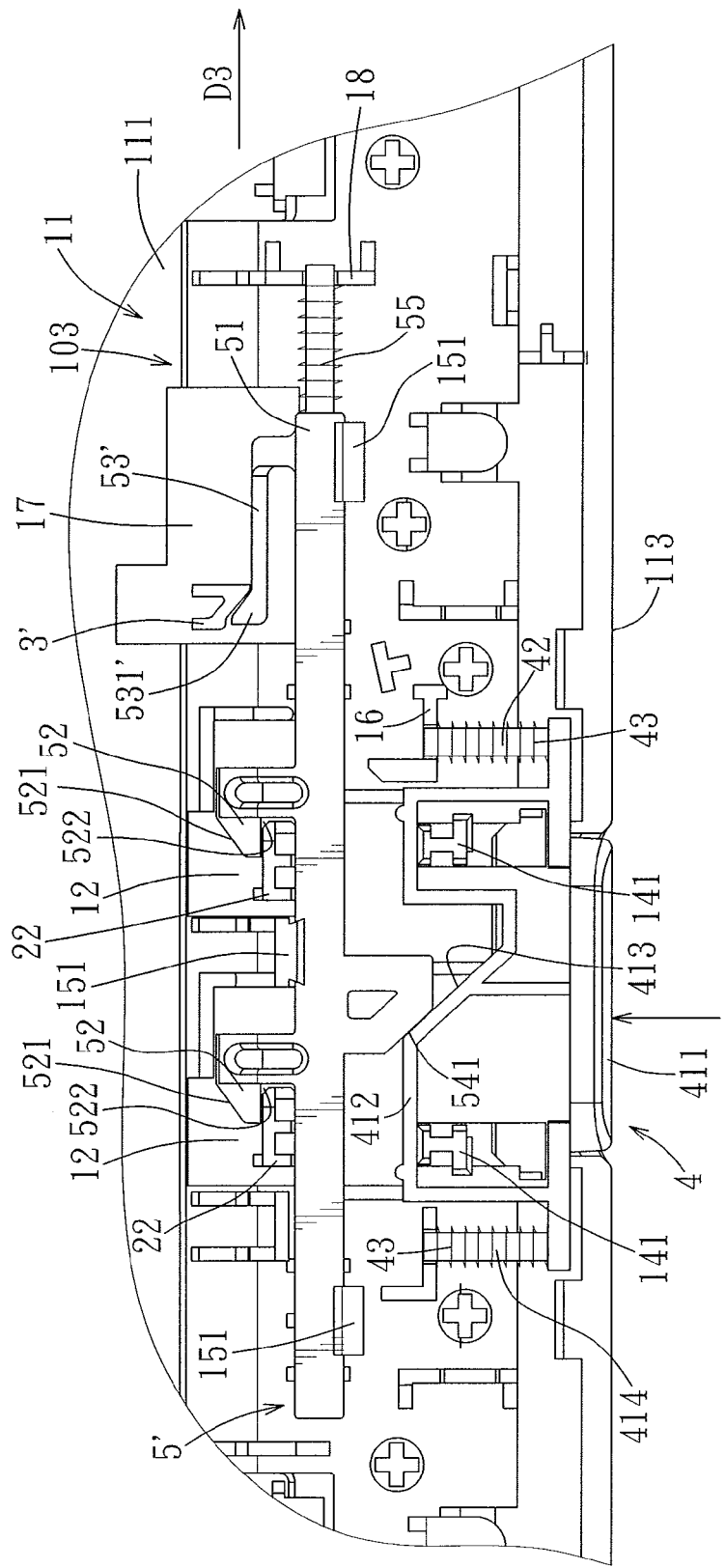
FIG. 9 is a plan view of the second preferred embodiment, illustrating that the drive member is in an engaging position.
Figure 10:
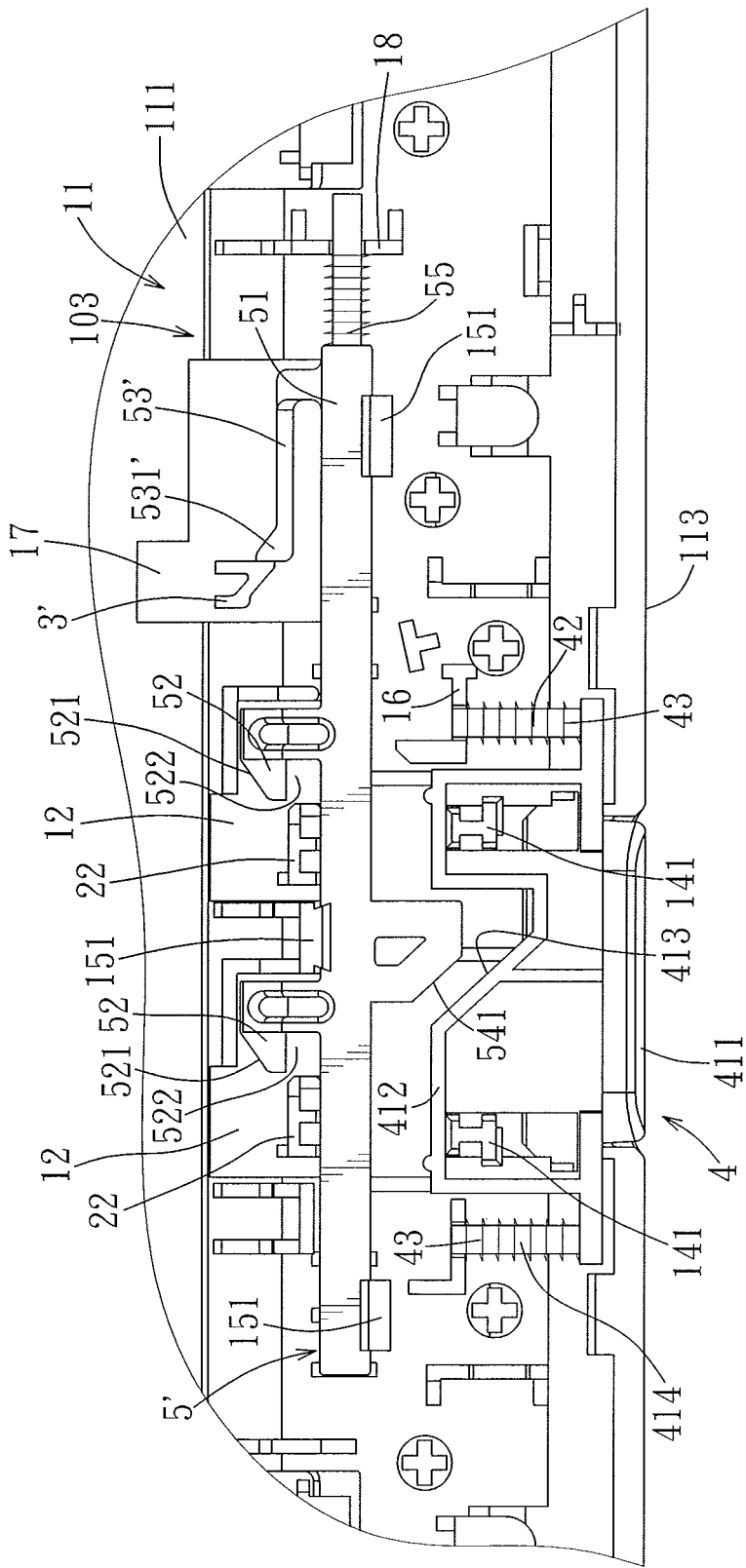
FIG. 10 is a view similar to FIG. 9 but illustrating that the drive member is in a retracted position.

Referring to FIGS. 8 to 10, when the operable member 4 is pressed to move the drive member 5' in the first direction D3, the extension portion 53' of the drive member 5' is moved to permit the extension portion 53' to be pushed and deformed by the stop member 3' to pass past the stop member 3' and is biased by the spring 55 to abut against the stop member 3', thereby maintaining the drive member 5 in the retracted position. On the other hand, when the second housing 2 is disassembled from the first housing 1, since the stop member 3' is disengaged from the second opening 17, the extension portion 53' is no longer stopped by the stop member 3', so that the drive member 5 can be restored to the engaging position through the resilient force of the spring 55.

Therefore, in the second preferred embodiment, due to the presence of the stop member 3' disposed on the second housing 2, separation of the second housing 2 from the first housing 1 results in release of the extension portion 53' from the stop member 3', thereby eliminating the need for pressing again the operable member 4 by the user.

Figure 11:
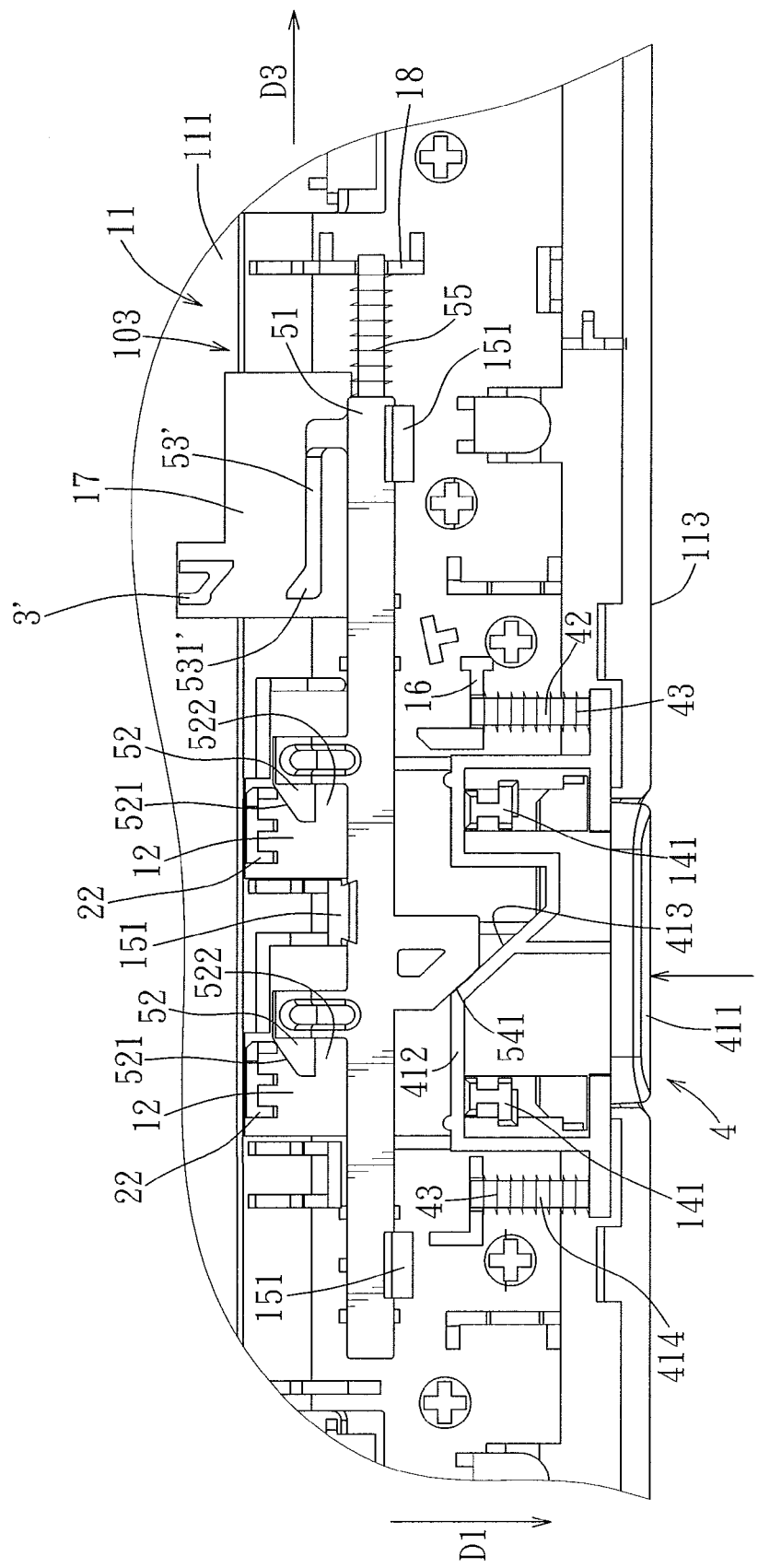
FIG. 11 is a schematic view illustrating that, in the second preferred embodiment, the second housing is assembled to the first housing in an assembly direction.

Referring to FIG. 11, on the other hand, when it is desired to assemble the second housing 2 to the first housing 1, the projections 22 of the second housing 2 are first inserted respectively into the first openings 12 of the first housing 1. Next, the second housing 2 is moved relative to the first housing 1 in the assembly direction D1, so that the projections 22 come into contact with the inclination surfaces 521 to move the engaging portions 52 in the first direction D3, thereby compressing the spring 55. As soon as the projections 22 pass past the inclination surfaces 521, each of the engaging portions 52 is restored to the engaging position by the resilient force of the spring 55 and is hooked over the corresponding projection 22, that is, the projections 22 are moved respectively into the engaging grooves 522 between the engaging portions 52 and the drive body 51.

In sum, by virtue of the cooperation of the extension portion 53, 53' with the stop member 3, 3', when the drive member 5, 5' is moved to the retracted position by the operable member 4, it can be maintained in the retracted position. In this way, the user can concentrate attention on the action for separating the second housing 2 from the first housing 1 without pressing continuously the operable member 4 to maintain the position of the drive member 5, 5', thereby further facilitating the operation of detaching the second housing 2 by the user.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
   a housing unit, including
      a first housing,
      a second housing coupled to said first housing and movable relative to said first housing in a disassembly direction so as to separate from said first housing, and
      a stop member disposed on one of said first housing and said second housing; and
   an electronic module connected to said housing unit; and
   a locking mechanism including
      an operable member mounted on said first housing and operable to move resiliently;
      a drive member movable to a retracted position by pressing said operable member and biased to an engaging position such that, when in said engaging position, said drive member engages said second housing so as to prevent movement of said second housing relative to said first housing in said disassembly direction, and when in said retracted position, said second housing is allowed to move relative to said first housing in said disassembly direction, and said drive member is stopped releasably by said stop member so as to prevent said drive member from restoring to said engaging position.

2. The electronic device as claimed in claim 1, wherein said first housing includes a first plate member and a first opening that is formed in said first plate member, said second housing including a second plate member and a projection that is formed on said second plate member and that extends through said first opening, disengagement of said projection from said first opening in said disassembly direction being prevented by said drive member when said drive member is in said engaging position.

3. The electronic device as claimed in claim 2, wherein said first housing further includes a first engaging structure disposed at said first plate member, said second housing further including a second engaging structure disposed at said second plate member, said second housing being coupled to said first housing by engaging said second engaging structure to said first engaging structure in an assembly direction that is opposite to said disassembly direction, said second housing being movable relative to said first housing in said disassembly direction to disengage said second engaging structure from said first engaging structure, said drive member being pushable by said operable member in a first direction that is perpendicular to said assembly direction to move to said retracted position such that said drive member is stopped at said retracted position by said stop member.

4. The electronic device as claimed in claim 3, wherein said drive member includes a drive body, an engaging portion connected to said drive body, and an extension portion connected to said drive body, said engaging portion being in a form of a hook, said projection being hooked over said engaging portion so as to prevent movement of said projection relative to said first housing in said disassembly direction when said drive member is in said engaging position, said extension portion being stopped by said stop member so as to prevent movement of said drive member to said engaging position when said drive member is in said retracted position.

5. The electronic device as claimed in claim 4, wherein said extension portion is in a form of a resilient arm and has an distal end portion that is spaced apart from said drive body, said extension portion being deformable resiliently to permit said distal end portion to approach said drive body, said distal end portion passing past said stop member and being pushed by said stop member to approach said drive body when said drive member is moved from said engaging position to said retracted position, said distal end portion extending from said drive body toward said stop member and abutting against said stop member when said drive member is in said retracted position.

6. The electronic device as claimed in claim 5, wherein said stop member is disposed on said first plate member, said extension portion extending generally parallel with said first direction, said operable member including an operable body and a push portion that is connected to said operable body, said operable body being operable to move resiliently in said disassembly direction, said push portion extending generally parallel with said disassembly direction and positioned such that, when said drive member is in said retracted position, said distal end portion of said extension portion is aligned with said push portion in said disassembly direction so as to be pushed to separate from said stop member by said push portion when said operable member is pressed.

7. The electronic device as claimed in claim 5, wherein said extension portion extends generally parallel with said first direction, said stop member being disposed on said second plate member, said first plate member having a second opening through which said stop member extends, said stop member separating from said extension portion when said second housing is moved relative to said first housing in said disassembly direction.

8. The electronic device as claimed in claim 7, wherein said engaging portion and said drive body define cooperatively an engaging groove therebetween, said engaging portion having an inclination surface that faces away from said engaging groove, said inclination surface being allowed to be pushed by said projection in said assembly direction to result in movement of said drive member in said first direction.

9. The electronic device as claimed in claim 6, wherein said first plate member further has a plate edge, said operable member further including a spring, said operable body having a pressing end that extends out of said plate edge and an inner end that is opposite to said pressing end, said inner end having a first inclination surface that abuts against said drive body, said pressing end being operable to move in said disassembly direction, so that said drive body is pushed to move in said first direction by said first inclination surface, said spring being disposed between said first housing and said operable body to provide a biasing force for restoring said operable body to its original position.

10. The electronic device as claimed in claim 9, wherein said first housing further includes a first guiding structure that is disposed on said first plate member for guiding said operable body to move in said disassembly direction.

11. The electronic device as claimed in claim 9, wherein said first housing further includes a second guiding structure that is disposed on said first plate member for guiding said drive body to move in said first direction.

* * * * *